United States Patent
Lee et al.

(10) Patent No.: US 11,102,759 B2
(45) Date of Patent: *Aug. 24, 2021

(54) RESOURCE MANAGEMENT IN A WIRELESS COMMUNICATION SYSTEM

(71) Applicant: LG Electronics Inc., Seoul (KR)

(72) Inventors: Gyeongcheol Lee, Seoul (KR); Sunyoung Lee, Seoul (KR); Seungjune Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/720,883

(22) Filed: Dec. 19, 2019

(65) Prior Publication Data
US 2020/0128513 A1 Apr. 23, 2020

Related U.S. Application Data

(63) Continuation of application No. 16/123,442, filed on Sep. 6, 2018, now Pat. No. 10,524,232.
(Continued)

(51) Int. Cl.
*H04W 72/02* (2009.01)
*H04W 72/14* (2009.01)
(Continued)

(52) U.S. Cl.
CPC ........... *H04W 72/02* (2013.01); *H04W 72/14* (2013.01); *H04W 76/38* (2018.02); *H04W 72/1278* (2013.01)

(58) Field of Classification Search
CPC ........... H04W 72/0406; H04W 72/042; H04W 72/048; H04W 74/002; H04W 74/08;
(Continued)

(56) References Cited

U.S. PATENT DOCUMENTS 10,524,232 B2 * 12/2019 Lee ................. H04W 72/14
2011/0243048 A1 10/2011 Wang et al.
(Continued)

FOREIGN PATENT DOCUMENTS

CN 102104465 6/2011
EP 3110193 12/2016
(Continued)

OTHER PUBLICATIONS

Huawei et al., R1-162590, Consideration on multiplexing of nonsTTI and sTTI in the same carrier, 3GPP TSG RAN WG1 #84bis, 3GPP (Apr. 1, 2016) Whole document. (Year: 2016).
(Continued)

*Primary Examiner* — Mohamed A Kamara
(74) *Attorney, Agent, or Firm* — Fish & Richardson P.C.

(57) ABSTRACT

A method of performing, by a user equipment (UE), wireless communication using a serving cell in a wireless communication system is provided. The method includes: starting a deactivation timer associated with the serving cell, the deactivation timer relating to a duration of time after which the serving cell is deactivated; determining whether there is an uplink (UL) grant or a downlink (DL) assignment for the serving cell in a time unit; based on a determination that there is an UL grant or a DL assignment, determining whether a data unit is transmitted on the UL grant or is received on the DL assignment; based on a determination that the data unit is transmitted on the UL grant or is received on the DL assignment: restarting the deactivation timer associated with the serving cell; and transmitting the data unit on the UL grant or receiving the data unit on the DL assignment.

20 Claims, 10 Drawing Sheets

Related U.S. Application Data

(60) Provisional application No. 62/555,033, filed on Sep. 6, 2017.

(51) Int. Cl.
*H04W 76/38* (2018.01)
*H04W 72/12* (2009.01)

(58) Field of Classification Search
CPC . H04W 74/0833; H04W 74/04; H04W 24/10; H04W 28/0278; H04W 72/12; H04W 72/14; H04W 76/02; H04W 76/04; H04L 5/0055; H04L 5/0096; H04L 5/0098; H04L 5/0037
See application file for complete search history.

(56) References Cited

U.S. PATENT DOCUMENTS

| | | |
|---|---|---|
| 2011/0243106 A1 | 10/2011 | Hsu |
| 2012/0294213 A1 | 11/2012 | Chen et al. |
| 2013/0010641 A1 | 1/2013 | Dinan |
| 2013/0021917 A1 | 1/2013 | Chen |
| 2014/0050113 A1 | 2/2014 | Rosa et al. |
| 2016/0029245 A1 | 1/2016 | Hong et al. |
| 2016/0205703 A1 | 7/2016 | Dudda |
| 2017/0054568 A1 | 2/2017 | Lee et al. |
| 2017/0086172 A1 | 3/2017 | Dinan |
| 2018/0027461 A1* | 1/2018 | Jia .................. H04W 76/36 370/329 |

FOREIGN PATENT DOCUMENTS

| | | |
|---|---|---|
| JP | 2015525501 | 9/2015 |
| JP | 2015533043 | 11/2015 |
| KR | 1020120094496 | 8/2012 |
| KR | 1020160108235 | 9/2016 |
| KR | 1020170038760 | 4/2017 |
| WO | 02014133271 | 9/2014 |
| WO | 02014186932 | 11/2014 |
| WO | WO2015139768 | 9/2015 |

OTHER PUBLICATIONS

Intel Corporation, R1-160862, On multiplexing of POSCH with different TTIs and related enhancements, 3GPP TSG RAN WG1 #84, 3GPP (Feb. 6, 2016) Whole document. (Year: 2016).
PCT International Search Report and Written Opinion in International Application No. PCT/KR2018/010415, dated Dec. 6, 2018, 10 pages.
3GPP TS 36.321 v14.3.0, "3GPP; TSGRAN; E-UTRA; MAC protocol specification (Release 14)", dated Jun. 23, 2017, 109 pages.
Extended European Search Report in European Application No. 18852741.0, dated Jul. 13, 2020, 9 pages.
HTC, "Clarification on HARQ feedback on PSCell and PUCCH SCell," R2-167516, 3GPP TSG-RAN2 RAN2 Meeting #96, Reno, USA, dated Nov. 14-18, 2016, 3 pages, XP051191802.

* cited by examiner (a) Control-Plane Protocol Stack (b) User-Plane Protocol Stack (a)

(b)

RESOURCE MANAGEMENT IN A WIRELESS COMMUNICATION SYSTEM

CROSS-REFERENCE TO RELATED APPLICATIONS

This application is a continuation of U.S. application Ser. No. 16/123,442, filed on Sep. 6, 2018, which claims the benefit of an earlier filing date and right of priority to U.S. Provisional Application No. 62/555,033, filed on Sep. 6, 2017 the contents of which are incorporated herein by reference in their entirety.

TECHNICAL FIELD

The present disclosure relates to a wireless communication system.

BACKGROUND

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information. In particular, overcoming delay or latency has become an important challenge in applications whose performance critically depends on delay/latency.

SUMMARY

In an aspect of the present disclosure, provided herein is a method for performing, by a user equipment (UE), wireless communication using a serving cell of the UE in a wireless communication system. The method includes: starting a deactivation timer associated with the serving cell of the UE, the deactivation timer relating to a duration of time after which the serving cell is to be deactivated; determining whether there is an uplink (UL) grant or a downlink (DL) assignment for the serving cell in a time unit; based on a determination that there is the UL grant or the DL assignment for the serving cell in the time unit, determining whether there is a data unit for transmission on the UL grant or reception on the DL assignment for the serving cell in the time unit; based on a determination that there is a data unit for transmission on the UL grant or reception on the DL assignment for the serving cell in the time unit: restarting the deactivation timer associated with the serving cell in the time unit; and transmitting the data unit on the UL grant or receiving the data unit on the DL assignment by a transceiver of the UE.

In another aspect of the present disclosure, provided herein is a user equipment for performing wireless communication using a serving cell of the UE in a wireless communication system. The UE is equipped with a transceiver, at least one processor, and at least one computer memory that is operably connectable to the at least one processor and that has stored thereon instructions which, when executed, cause the at least one processor to perform operations including: starting a deactivation timer associated with the serving cell of the UE, the deactivation timer relating to a duration of time after which the serving cell is to be deactivated; determining whether there is an uplink (UL) grant or a downlink (DL) assignment for the serving cell in a time unit; based on a determination that there is the UL grant or the DL assignment for the serving cell in the time unit, determining whether there is a data unit for transmission on the UL grant or reception on the DL assignment for the serving cell in the time unit; based on a determination that there is a data unit for transmission on the UL grant or reception on the DL assignment for the serving cell in the time unit: restarting the deactivation timer associated with the serving cell in the time unit; and controlling the transceiver of the UE to transmit the data unit on the UL grant or to receive the data unit on the DL assignment.

Implementations of each of these aspects may include one or more of the following features. Based on a determination that there is no data unit for transmission on the UL grant or reception on the DL assignment for the serving cell in the time unit, the UE does not restart the deactivation timer associated with the serving cell in the time unit. Based on a determination that (i) there is no data unit for transmission on the UL grant or reception on the DL assignment for the serving cell in the time unit, and that (ii) an activation command for activating the serving cell is not received in the time unit: the UE does not restart the deactivation timer associated with the serving cell in the time unit. The UL grant or the DL assignment is configured to occur periodically on the serving cell. Determining whether there is the uplink (UL) grant or the downlink (DL) assignment for the serving cell in the time unit includes: determining a physical downlink control channel (PDCCH) for the serving cell; and determining whether the PDCCH for the serving cell indicates that there is the UL grant or the DL assignment for the serving cell in the time unit. The serving cell includes a secondary cell (SCell) configured for the UE in the wireless communication system, and the UE is further configured to utilize a primary cell (PCell), different from the SCell, in the wireless communication system. The UE determines an expiration of the deactivation timer associated with the serving cell; and deactivates the serving cell based on a determination of the expiration of the deactivation timer associated with the serving cell.

In a further aspect of the present disclosure, provided herein is a method for performing, by a base station (BS), wireless communication with a user equipment (UE) using a serving cell of the UE in a wireless communication system. The method includes: starting a deactivation timer associated with the serving cell of the UE, the deactivation timer relating to a duration of time after which the serving cell is to be deactivated; determining whether there is an uplink (UL) grant or a downlink (DL) assignment for the serving cell in a time unit; based on a determination that there is the UL grant or the DL assignment for the serving cell in the time unit, determining whether there is a data unit for reception on the UL grant or transmission on the DL assignment for the serving cell in the time unit; based on a determination that there is a data unit for reception on the UL grant or transmission on the DL assignment for the serving cell in the time unit: restarting the deactivation timer associated with the serving cell in the time unit; and controlling a transceiver of the BS to receive the data unit on the UL grant or to transmit the data unit on the DL assignment.

In a still further aspect of the present disclosure, provided herein is a base station (BS) for performing wireless communication with a user equipment (UE) using a serving cell of the UE in a wireless communication system. The BS is equipped with a transceiver, at least one processor, and at least one computer memory that is operably connectable to the at least one processor and that has stored thereon instructions which, when executed, cause the at least one processor to perform operations including: starting a deactivation timer associated with the serving cell of the UE, the deactivation timer relating to a duration of time after which the serving cell is to be deactivated; determining whether there is an uplink (UL) grant or a downlink (DL) assignment for the serving cell in a time unit; based on a determination that there is the UL grant or the DL assignment for the serving cell in the time unit, determining whether there is a data unit for reception on the UL grant or transmission on the DL assignment for the serving cell in the time unit; based on a determination that there is a data unit for reception on the UL grant or transmission on the DL assignment for the serving cell in the time unit: restarting the deactivation timer associated with the serving cell in the time unit; and controlling the transceiver of the BS to receive the data unit on the UL grant or to transmit the data unit on the DL assignment.

Implementations of each of these aspects may include one or more of the following features. Based on a determination that there is no data unit for reception on the UL grant or transmission on the DL assignment for the serving cell in the time unit, the BS does not restart the deactivation timer associated with the serving cell in the time unit. Based on a determination that (i) there is no data unit for reception on the UL grant or transmission on the DL assignment for the serving cell in the time unit, and that (ii) an activation command for activating the serving cell is not transmitted in the time unit, the BS does not restart the deactivation timer associated with the serving cell in the time unit. The UL grant or the DL assignment is configured to occur periodically on the serving cell Determining whether there is the uplink (UL) grant or the downlink (DL) assignment for the serving cell in the time unit includes: determining a physical downlink control channel (PDCCH) for the serving cell; and determining whether the PDCCH for the serving cell indicates that there is the UL grant or the DL assignment for the serving cell in the time unit. The serving cell includes a secondary cell (SCell) configured for the UE in the wireless communication system, the UE is further configured to utilize a primary cell (PCell), different from the SCell, in the wireless communication system. The BS may further perform operations including: determining an expiration of the deactivation timer associated with the serving cell; and deactivating the serving cell based on a determination of the expiration of the deactivation timer associated with the serving cell.

The above technical solutions are merely some parts of the implementations of the present disclosure and various implementations into which the technical features of the present disclosure are incorporated can be derived and understood by persons skilled in the art from the following detailed description of the present disclosure.

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

DETAILED DESCRIPTION

Figure 1:
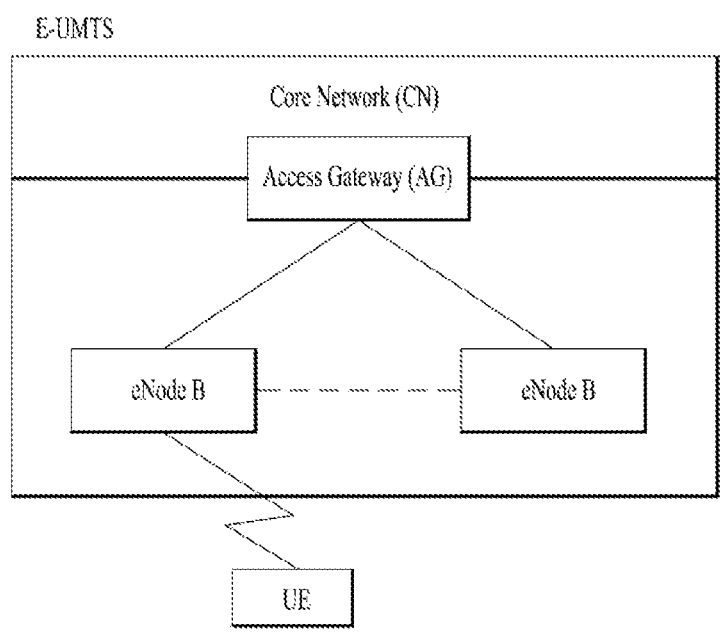
FIG. 1 is a diagram illustrating an example of a network structure of an evolved universal mobile telecommunication system (E-UMTS) as an exemplary radio communication system.

In some wireless communication systems, a collection of "cells" is typically implemented to manage radio resources in different geographic regions. A cell typically provides downlink (DL) and/or uplink (UL) transmission services to a plurality of user equipment (UE) devices. Different types of cells may be implemented, such as a primary cell (Pcell) operating on a primary frequency, and a secondary cell (Scell) operating on a secondary frequency. In particular, a Scell may be configured after completion of connection establishment and may be used to provide additional radio resources in the wireless network.

If a UE is configured with one or more SCells, the wireless network may activate and deactivate the configured SCells. In some situations, the UE and the wireless network maintain a timer referred to as the sCellDeactivationTimer for a configured SCell. The associated SCell is then configured to be deactivated upon expiry of the timer sCellDeactivationTimer. The sCellDeactivationTimer timer may be maintained at a Medium Access Control (MAC) entity in the UE and in the network.

In some systems, as described in further detail below, a problem occurs in that a UE may be configured to restart the timer sCellDeactivationTimer associated with an SCell merely based on an indication that there is an uplink grant or downlink assignment for the activated SCell. In such scenarios, the UE restarts the timer sCellDeactivationTimer associated with the SCell irrespective of whether a data unit (e.g., a MAC PDU) is actually available to be transmitted or received on the given uplink grant or downlink assignment, respectively.

However, situations may occur in which there is an uplink grant or downlink assignment, but there may not be any data unit to be transmitted or received. Thus, a problem occurs in that even if a UE does not actually use a given grant or assignment on a SCell because there is no data unit (e.g., MAC PDU) to be transmitted or received, the UE nonetheless restarts the timer sCellDeactivationTimer associated with the SCell.

According to implementations disclosed herein, a UE is configured to restart the timer sCellDeactivationTimer of a SCell when the UE actually transmits a MAC PDU by using an uplink grant or when the UE receives a MAC PDU using a downlink assignment. As such, the UE is configured to restart the sCellDeactivationTimer for the SCell only when the UE actually transmits or receives a MAC PDU by using the uplink grant or downlink assignment. Conversely, the UE does not restart the sCellDeactivationTimer for the SCell if the UE does not transmit or receive a MAC PDU by using the uplink grant or downlink assignment. Therefore, according to implementations disclosed herein, a UE does not necessarily restart the sCellDeactivationTimer for an SCell merely based on detecting an uplink grant or a downlink assignment, but instead restarts the timer based on detecting that a transmission/reception of a data unit actually occurs on the uplink grant or downlink assignment.

The technical objects that can be achieved through the present disclosure are not limited to what has been particularly described hereinabove and other technical objects not described herein will be more clearly understood by persons skilled in the art from the following detailed description.

As an example of a mobile communication system to which the present disclosure is applicable, a 3rd Generation Partnership Project Long Term Evolution (hereinafter, referred to as LTE) communication system is described in brief.

FIG. 1 is a diagram illustrating an example of a network structure of an E-UMTS as an exemplary radio communication system. An Evolved Universal Mobile Telecommunications System (E-UMTS) is an advanced version of a Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, a cell refers to a prescribed geographical area to which one or more nodes provide a communication service. Accordingly, in the present disclosure, communicating with a specific cell may include communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

In some scenarios, a 3GPP based system implements a cell to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

In some scenarios, the recent 3GPP based wireless communication standard implements a cell to manage radio resources. The "cell" associated with the radio resources utilizes a combination of downlink resources and uplink resources, for example, a combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell refers to a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

If a UE is configured with one or more SCells, the network may activate and deactivate the configured SCells. The special cell (SpCell) is always activated. The network activates and deactivates the SCell(s) by sending the Activation/Deactivation MAC control element (CE) described. Furthermore, the MAC entity at each of the UE and the network maintains a timer referred to as the sCellDeactivationTimer per configured SCell (except the SCell configured with PUCCH, if any) and deactivates the associated SCell upon expiry of the timer. The same initial timer value applies to each instance of the sCellDeactivationTimer and the initial timer value is configured by RRC. The configured SCells are initially deactivated upon addition and after a handover. The configured secondary cell group (SCG) SCells are initially deactivated after a SCG change. For each TTI and for each configured SCell, the following logical flow applies:

if the MAC entity receives an Activation/Deactivation MAC control element in this TTI activating the SCell, the MAC entity shall perform the following operations in the TTI according to the timing defined in the section "Timing for Secondary Cell Activation/Deactivation" of 3GPP TS 36.213:
        activate the SCell; i.e. apply normal SCell operation including: SRS transmissions on the SCell; CQI/PMI/RI/PTI/CRI reporting for the SCell; PDCCH monitoring on the SCell; PDCCH monitoring for the SCell; and PUCCH transmissions on the SCell, if configured.
        start or restart the sCellDeactivationTimer associated with the SCell;
        trigger power headroom reporting (PHR).
    else, if the MAC entity receives an Activation/Deactivation MAC control element in this TTI deactivating the SCell; or if the sCellDeactivationTimer associated with the activated SCell expires in this TTI:
        in the TTI according to the timing defined in the section "Timing for Secondary Cell Activation/Deactivation" of 3GPP TS 36.213, the MAC entity shall deactivate the SCell, stop the sCellDeactivationTimer associated with the SCell, and flush all HARQ buffers associated with the SCell.
    if PDCCH on the activated SCell indicates an uplink grant or downlink assignment; or if PDCCH on the Serving Cell scheduling the activated SCell indicates an uplink grant or a downlink assignment for the activated SCell, the MAC entity shall:
        restart the sCellDeactivationTimer associated with the SCell.

If the SCell is deactivated, the MAC entity shall not transmit SRS on the SCell; not report CQI/PMI/RI/PTI/CRI for the SCell; not transmit on uplink shared channel (UL-SCH) on the SCell; not transmit on RACH on the SCell; not monitor the PDCCH on the SCell; not monitor the PDCCH for the SCell; not transmit PUCCH on the SCell.

Referring to the section "Timing for Secondary Cell Activation/Deactivation" of 3GPP TS 36.213, the SCell Activation/Deactivation timing in the LTE system is as follows. When a UE receives an activation command for a SCell in subframe n, the corresponding actions in MAC shall be applied no later than the minimum requirement defined in 3GPP TS 36.133 and no earlier than subframe n+8, except for the following: the actions related to CSI reporting on a serving cell which is active in subframe n+8, the actions related to the sCellDeactivationTimer associated with the SCell, and the actions related to CSI reporting on a serving cell which is not active in subframe n+8. The actions related to CSI reporting on a serving cell which is active in subframe n+8 and the actions related to the sCellDeactivationTimer associated with the SCell shall be applied in subframe n+8. The actions related to CSI reporting on a serving cell which is not active in subframe n+8 shall be applied in the earliest subframe after n+8 in which the serving cell is active. When a UE receives a deactivation command for a SCell or the sCellDeactivationTimer associated with the SCell expires in subframe n, the corresponding actions in MAC shall apply no later than the minimum requirement defined in 3GPP TS 36.133, except for the actions related to CSI reporting on a serving cell which is active. The actions related to CSI reporting on a serving cell which is active shall be applied in subframe n+8.

In the present disclosure, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

In the present disclosure, for dual connectivity (DC) operation, the term "special Cell" refers to the PCell of the master cell group (MCG) or the PSCell of the secondary cell group (SCG), and otherwise the term Special Cell refers to the PCell. The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
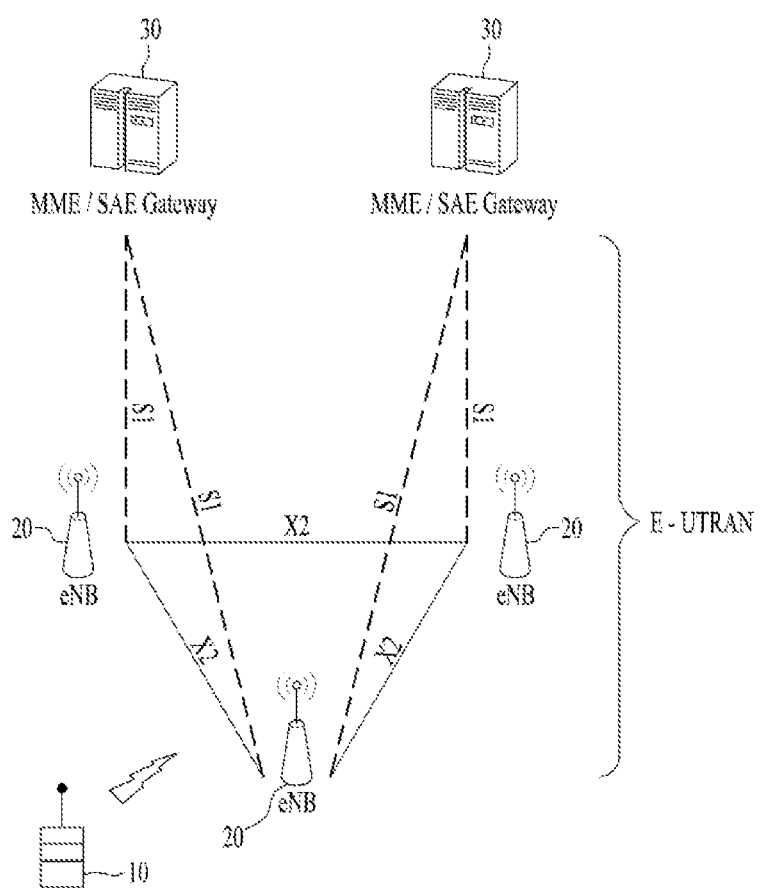
FIG. 2 is a block diagram illustrating an example of an evolved universal terrestrial radio access network (E-UTRAN)

FIG. 2 is a block diagram illustrating an example of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipments (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

Figure 3:
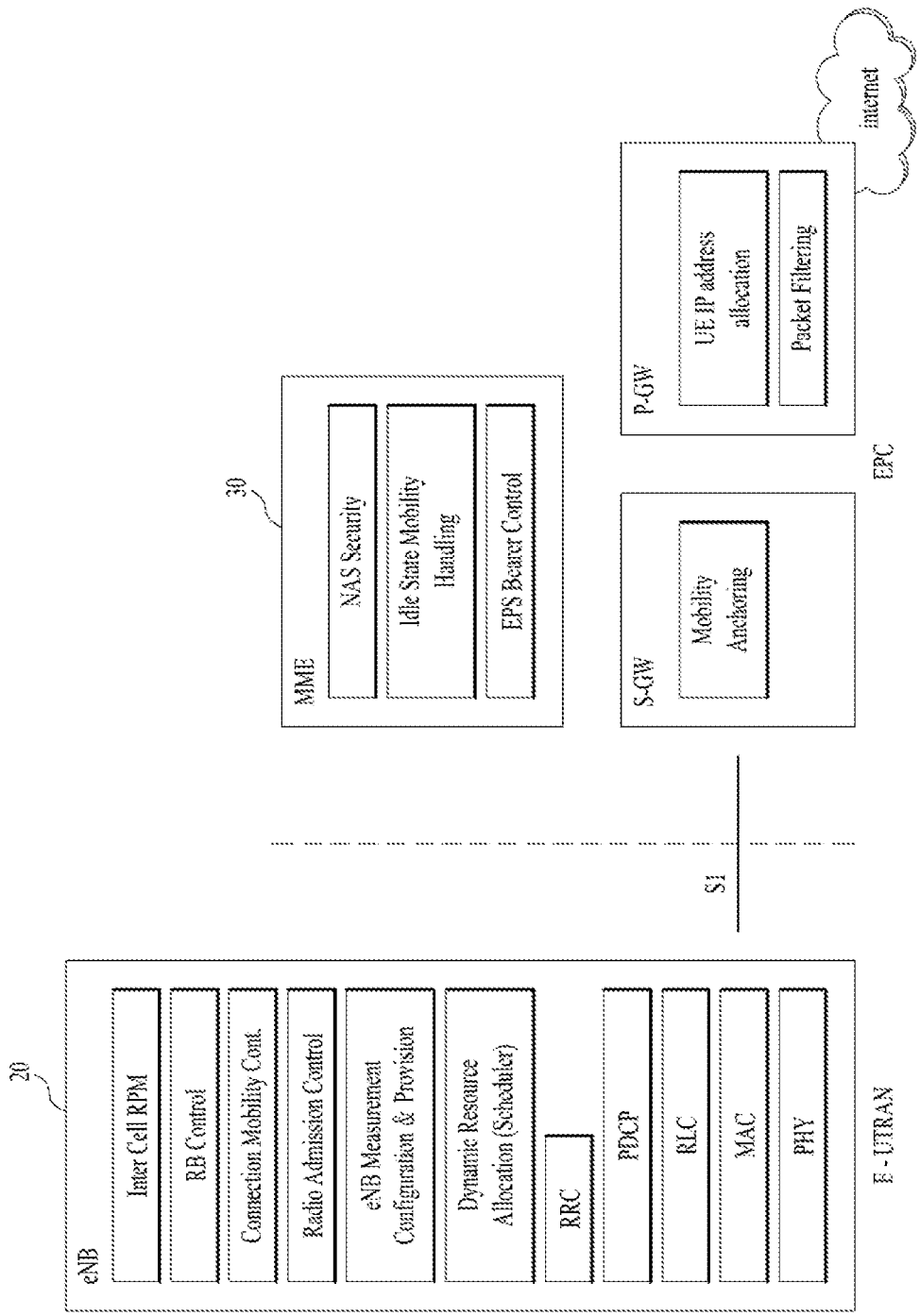
FIG. 3 is a block diagram depicting an example of an architecture of a typical E-UTRAN and a typical EPC.

FIG. 3 is a block diagram depicting an example of an architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
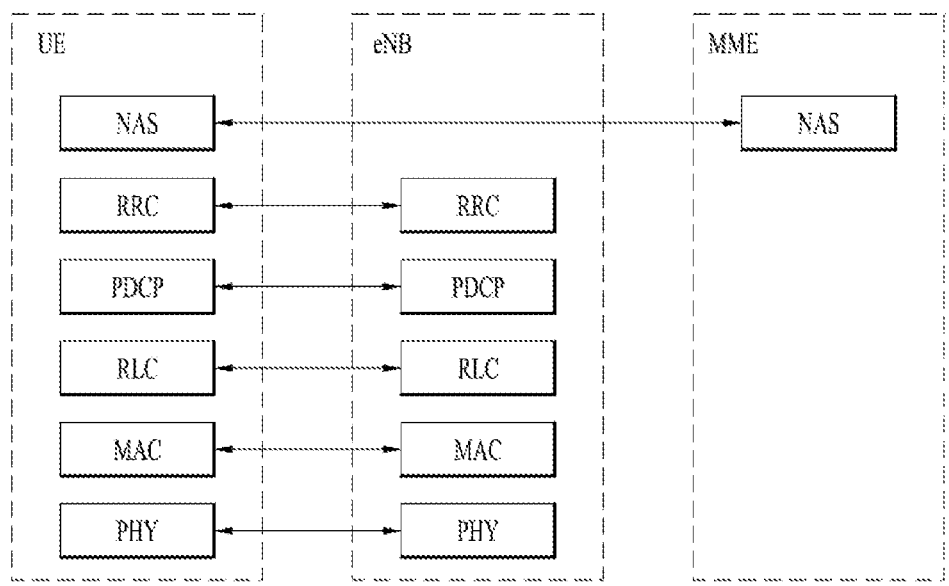
FIG. 4 is a diagram showing an example of a control plane and a user plane of a radio interface protocol between a UE and an E-UTRAN based on a 3GPP radio access network standard.
Figure 4:
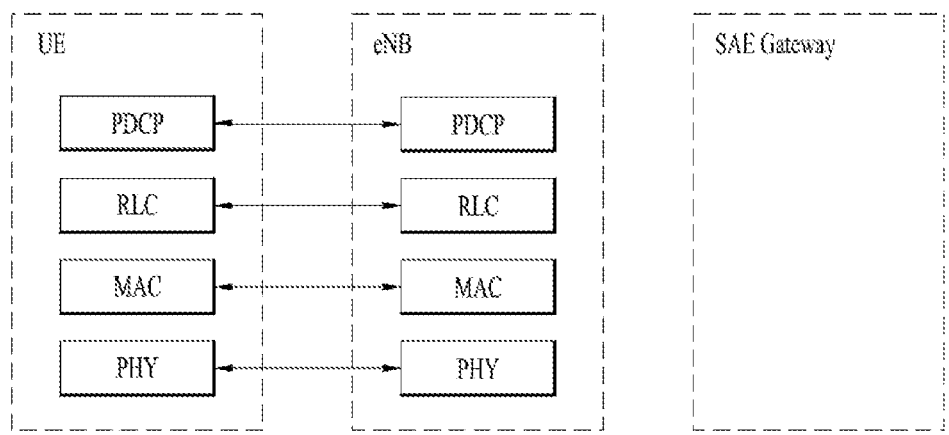

FIG. 4 is a diagram showing an example of a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split bearers in DC and LWA bearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
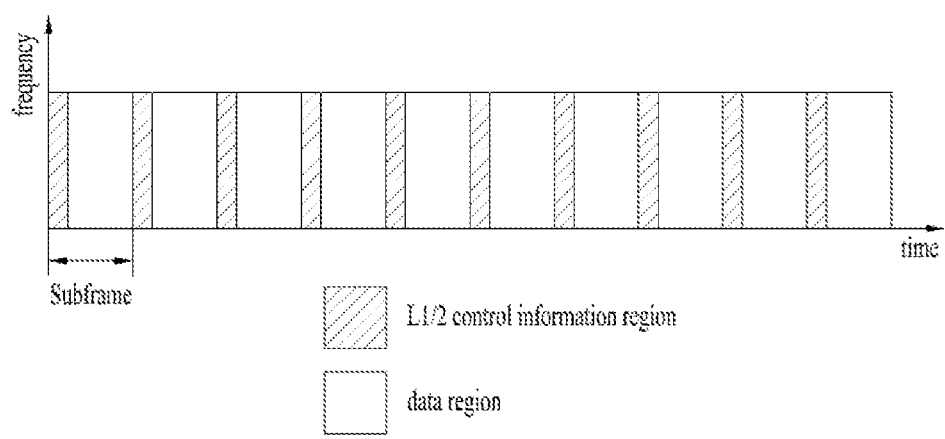
FIG. 5 is a diagram showing an example of a physical channel structure used in an E-UMTS system.

FIG. 5 is a diagram showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one implementation, a radio frame of 10 ms is used and one radio frame includes 10 subframes. In addition, in LTE, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a downlink shared channel (DL-SCH) which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one implementation, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receives the PDSCH indicated by B and C in the PDCCH information. In the present disclosure, a PDCCH addressed to an RNTI refers to the PDCCH being cyclic redundancy check masked (CRC-masked) with the RNTI. A UE may attempt to decode a PDCCH using the certain RNTI if the UE is monitoring a PDCCH addressed to the certain RNTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

Figure 6:
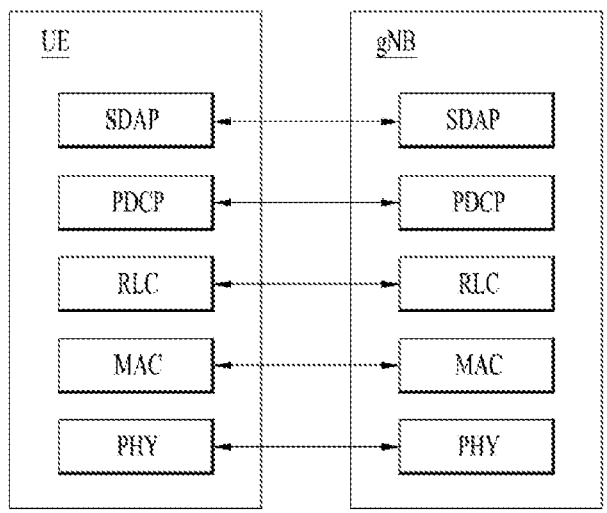
FIG. 6 illustrates an example of protocol stacks of a next generation wireless communication system.
Figure 6:
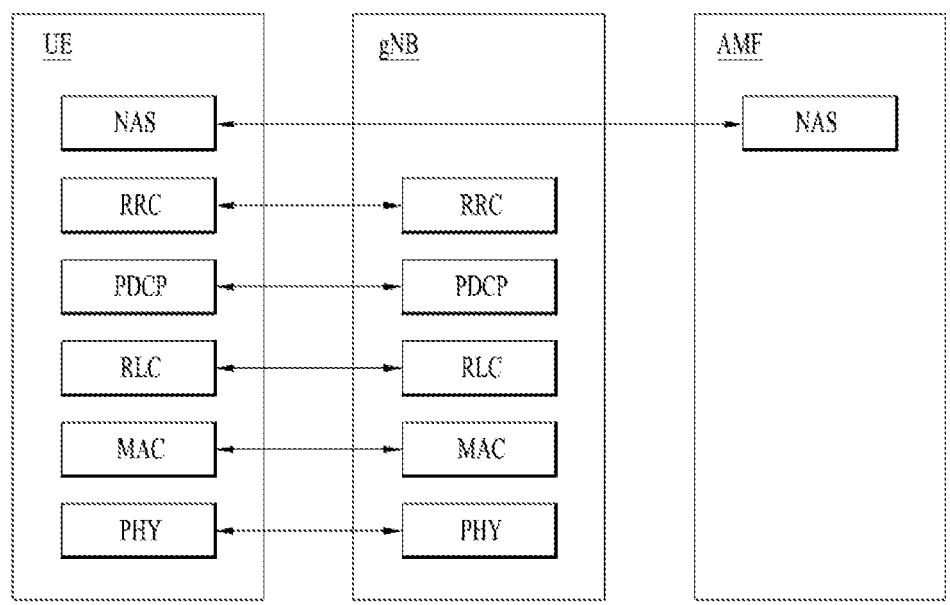

FIG. 6 illustrates an example of protocol stacks of a next generation wireless communication system. In particular, FIG. 6(a) illustrates an example of a radio interface user plane protocol stack between a UE and a gNB and FIG. 6(b) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 6(a), the user plane protocol stack may be divided into a first layer (Layer 1) (i.e., a physical layer (PHY) layer) and a second layer (Layer 2).

Referring to FIG. 6(b), the control plane protocol stack may be divided into Layer 1 (i.e., a PHY layer), Layer 2, Layer 3 (e.g., a radio resource control (RRC) layer), and a non-access stratum (NAS) layer.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signaling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by dynamic scheduling; priority handling between logical channels of one UE by logical channel prioritization; and padding. A single MAC entity can support one or multiple numerologies and/or transmission timings, and mapping restrictions in logical channel prioritization controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

The main services and functions of RRC sublayer of NR include: broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

Figure 7:
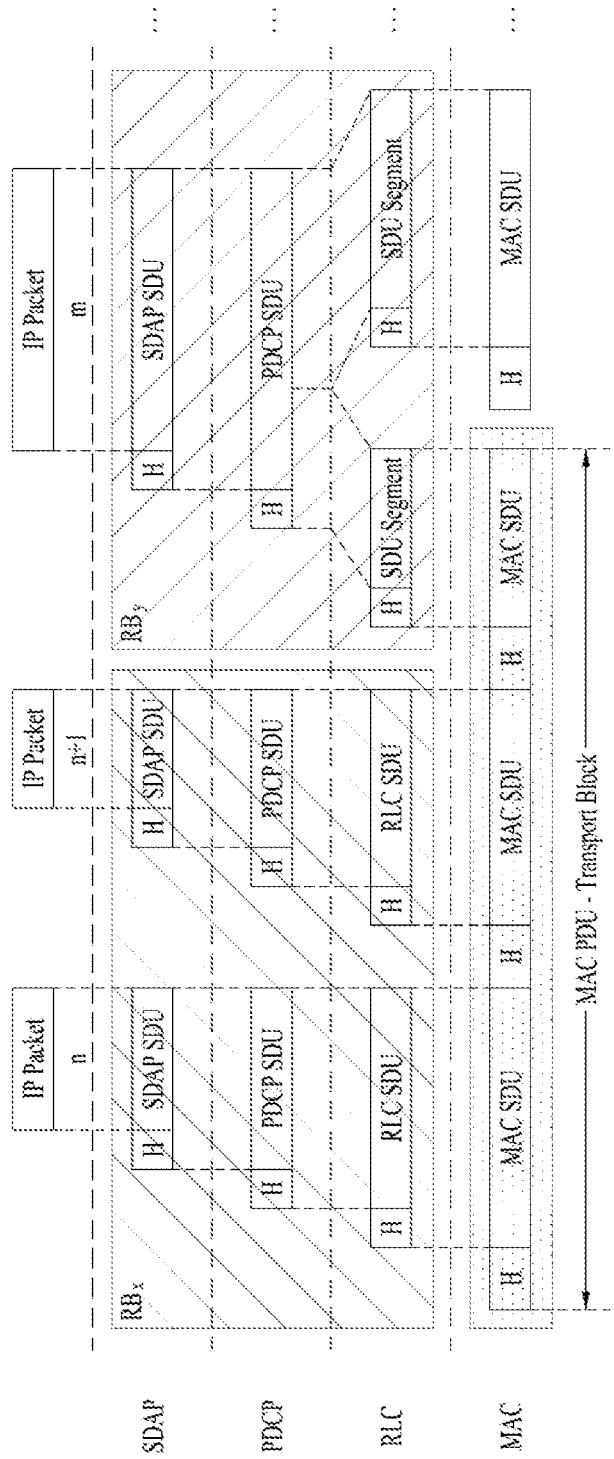
FIG. 7 illustrates an example of a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from $RB_x$ and one RLC PDU from $RB_y$. In FIG. 7, the two RLC PDUs from $RB_x$ each corresponds to one IP packet (n and n+1) while the RLC PDU from $RB_y$ is a segment of an IP packet (m). In NR, a RLC SDU segment can be located in the beginning part of a MAC PDU and/or in the ending part of the MAC PDU. The MAC PDU is transmitted/received using radio resources through a physical layer to/from an external device.

Figure 8:
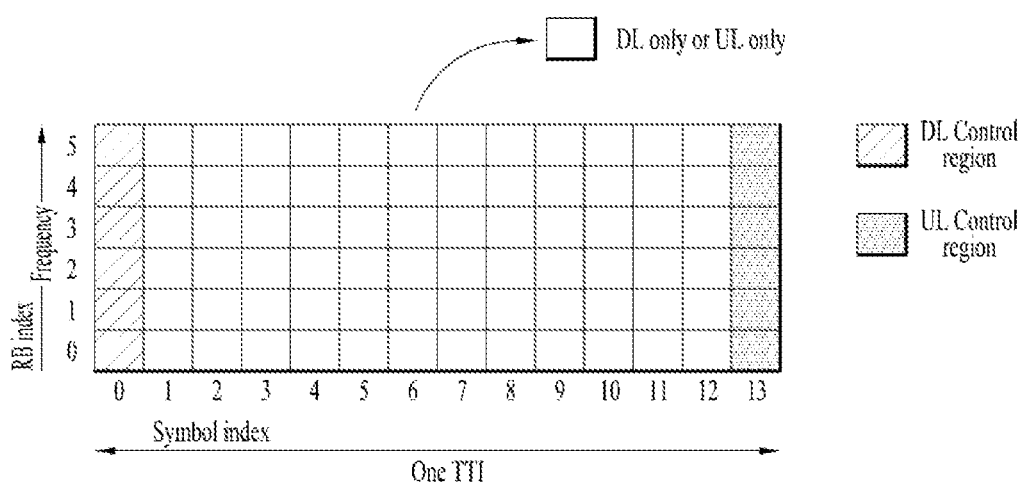
FIG. 8 illustrates an example of a slot structure available in a new radio access technology (NR)

FIG. 8 illustrates an example of a slot structure available in a new radio access technology (NR).

To reduce or minimize data transmission latency, in a 5G new RAT, a slot structure in which a control channel and a data channel are time-division-multiplexed is considered.

In the example of FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In the example of FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 8, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

In the NR system, a scheduler (e.g. BS) assigns radio resources in a unit of slot (e.g. one mini-slot, one slot, or multiple slots), and thus the length of one TTI in NR may be different from 1 ms.

In the 3GPP based communication system (e.g. LTE, NR), an uplink (UL) radio resource assigned by a scheduler is referred to as a UL grant, and a downlink (DL) radio resource assigned by a scheduler is referred as a DL assignment. A UL grant or DL assignment is dynamically indicated by a PDCCH or semi-persistently configured by a RRC signaling. In particular, a UL grant or DL assignment that is configured semi-persistently is referred to as a "configured UL grant" or a "configured DL assignment," respectively.

Downlink assignments transmitted on the PDCCH indicate if there is a transmission on a downlink shared channel (DL-SCH) for a particular MAC entity and provide the relevant HARQ information. In order to transmit on the uplink shared channel (UL-SCH) the MAC entity must have a valid uplink grant which it may receive dynamically on the PDCCH or in a Random Access Response or which may be configured semi-persistently or pre-allocated by RRC.

In the LTE system, when Semi-Persistent Scheduling is enabled by RRC, the following information is provided (see 3GPP TS 36.331): Semi-Persistent Scheduling C-RNTI or UL Semi-Persistent Scheduling V-RNTI; uplink Semi-Persistent Scheduling interval semiPersistSchedIntervalUL and number of empty transmissions before implicit release implicitReleaseAfter, if Semi-Persistent Scheduling with Semi-Persistent Scheduling C-RNTI is enabled for the uplink; uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink; whether twoIntervalsConfig is enabled or disabled for uplink, only for TDD; downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink. In the LTE system, after a Semi-Persistent downlink assignment is configured, the MAC entity considers sequentially that the $N^{th}$ assignment occurs in the subframe for which: $(10*SFN+subframe)=\{(10*SFN_{start\ time}+subframe_{start\ time})+N*semiPersistSchedIntervalDL\}$ modulo 10240. In the LTE system, after a Semi-Persistent Scheduling uplink grant is configured, the MAC entity:

if twoIntervalsConfig is enabled by upper layer (e.g. RRC layer), sets the Subframe_Offset according to Table 1, and else, sets Subframe_Offset to 0; and considers sequentially that the $N^{th}$ grant occurs in the subframe for which: $(10*SFN+subframe)=[(10*SFN_{start\ time}+subframe_{start\ time})+N*semiPersistSchedInterval\ UL+Subframe\_Offset*(N\ modulo\ 2)]$ modulo 10240, where $SFN_{start\ time}$ and $subframe_{start\ time}$ are the system frame number (SFN) and subframe, respectively, at the time the configured uplink grant were (re-)initialised.

TABLE 1

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | −1 |
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

If the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

In the LTE system, for each TTI, the HARQ entity of the MAC entity identifies the HARQ process(es) associated with this TTI, and for each identified HARQ process, if an uplink grant has been indicated for this process and this TTI, if the MAC entity is configured with skipUplinkTxSPS and if the uplink grant received on PDCCH was addressed to the Semi-Persistent Scheduling C-RNTI and if the HARQ buffer of the identified process is empty, the HARQ entity ignores the uplink grant. In the LTE system, if the MAC PDU includes only the MAC control element (CE) for padding buffer status report (BSR) or periodic BSR with zero MAC SDUs and there is no aperiodic channel state information (CSI) requested for this TTI, the MAC entity does not generate a MAC PDU for the HARQ entity in the following cases:

in case the MAC entity is configured with skip UplinkTxDynamic and the grant indicated to the HARQ entity was addressed to a C-RNTI; or in case the MAC entity is configured with skipUplinkTxSPS and the grant indicated to the HARQ entity is a configured uplink grant.

As described above, in an LTE system, when PDCCH on the activated SCell indicates an uplink grant or downlink assignment or when PDCCH on the serving cell scheduling the activated SCell indicates an uplink grant or a downlink assignment for the activated SCell, a UE should restart sCellDeactivationTimer associated with the SCell. In other words, in an LTE system, sCellDeactivationTimer associated with the SCell is restarted in a TTI in which the UE detects PDCCH carrying information indicating the UL grant or downlink assignment for the SCell. In an LTE system, the sCellDeactivationTimer associated with the SCell is restarted irrespective of whether a MAC PDU is actually present on the given grant/assignment. As such, in an LTE system, sCellDeactivationTimer associated with the SCell is restarted in a subframe in which a PDCCH carrying information indicating an UL grant or downlink assignment for the SCell is received/transmitted. For example, the MAC entity may not generate a MAC PDU for a given uplink grant if the MAC entity is configured with skip UplinkTxDynamic and if the MAC PDU is to include only the MAC CE for padding BSR or periodic BSR with zero MAC SDUs, and thus the given uplink grant may not be used by the UE. However, even though a UE does not use a given grant on a SCell because there is no MAC PDU to be transmitted or received in the given grant, the MAC entity of LTE should restart sCellDeactivationTimer associated with the SCell.

In an NR system, the same situation can occur because SPS can be configured on a SCell. If the MAC entity is configured with skipUplinkTxSPS and if the MAC PDU includes only the MAC CE for padding BSR or periodic BSR with zero MAC SDUs, a configured uplink grant may not be used. In other words, if there is no MAC PDU transmitted or received on the uplink grant or the downlink assignment, the given uplink grant and downlink assignment are really not used but the sCellDeactivationTimer is restarted unnecessarily. Therefore, considering skip UplinkTxDynamic and skipUplinkTxSPS, the restart condition of a sCellDeactivationTimer is redefined according to implementations disclosed herein.

Figure 9:
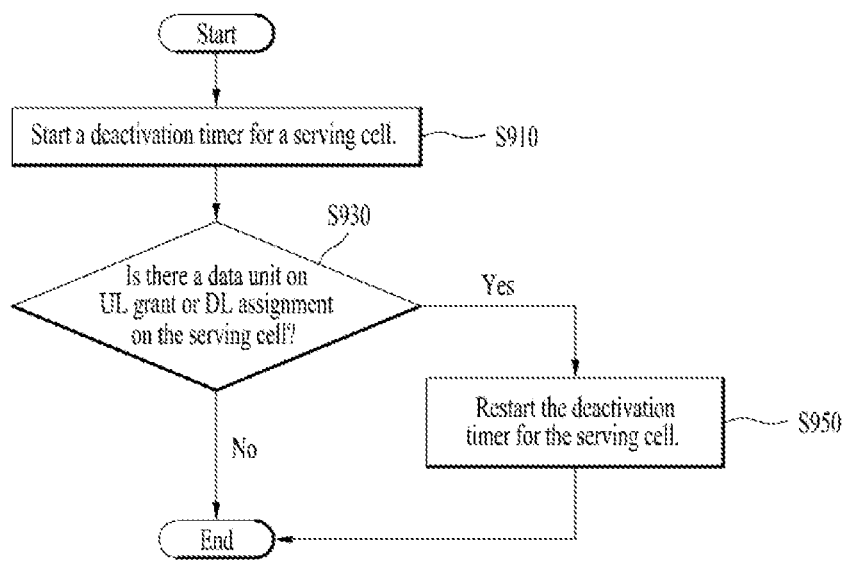
FIG. 9 illustrates an example of a flow diagram according to some implementations of the present disclosure.

FIG. 9 illustrates an example of a flow diagram according to some implementations of the present disclosure.

According to some implementations, a UE is configured to restart a sCellDeactivationTimer of a SCell when the UE transmits a MAC PDU by using an uplink grant or when the UE receives a MAC PDU using a downlink assignment.

A SCell of the UE is activated by the network. The UE starts sCellDeactivationTimer for the SCell activated by the network (S910). As an example, a UE starts sCellDeactivationTimer associated with a SCell in a time unit in which the UE activates the SCell. As another example, a UE starts sCellDeactivationTimer associated with a SCell in a time unit in which the UE receives an activation command for the SCell.

The UE receives an uplink grant/downlink assignment via PDCCH or is configured with an uplink grant/downlink assignment, for the SCell activated by the network. For a received uplink grant (e.g., dynamic UL grant indicated by a PDCCH) and configured uplink grant, a UE may be configured to skip the received uplink grant or configured uplink grant in case there is no data to transmit. As such, for a received uplink grant or configured uplink grant, a UE may be configured with skip UplinkTxDynamic or skipUplinkTxSPS. In some scenarios, for a configured downlink assignment, the UE may not receive a MAC PDU from the network in case there is no data to be transmitted in downlink by the network.

On a SCell, if the UE has an uplink grant or a downlink assignment in a time unit, the UE checks whether the UE transmits or receives a MAC PDU by using the uplink grant or the downlink assignment (S930). According to some implementations of the present disclosure, the time unit can be a subframe, slot, mini-slot, or symbol. If the UE does not transmit or receive the MAC PDU by using the uplink grant or the downlink assignment on the SCell in the time unit (S930, No), then the UE does not restart the sCellDeactivationTimer associated with the SCell in the time unit. If the UE transmits or receives the MAC PDU by using the uplink grant or the downlink assignment on the SCell in the time unit (S930, Yes), then the UE restarts the sCellDeactivationTimer associated with the SCell in the time unit (S950). As such, the UE restarts the sCellDeactivationTimer for the SCell only when the UE actually transmits or receives a MAC PDU by using the uplink grant or downlink assignment. Conversely, the UE does not restart the sCellDeactivationTimer for the SCell in the time unit if the UE does not transmit or receive a MAC PDU by using the uplink grant or downlink assignment in the time unit (unless another restart condition for the sCellDeactivationTimer is satisfied in the time unit).

In an LTE system, if an uplink grant or downlink assignment is a dynamic grant, then a UE/BS would restart sCellDeactivationTimer for a SCell at a time unit where the UE/BS detects/transmits a PDCCH indicating the uplink grant or downlink assignment. By contrast, according to implementations of the present disclosure, the UE/BS would not restart the sCellDeactivationTimer for the SCell at the time unit where the UE/BS detects/transmits the PDCCH indicating the uplink grant or downlink assignment, but instead restarts the timer in a time unit where the uplink grant or downlink assignment is present and transmission/reception of a data unit actually occurs on the uplink grant or downlink assignment.

If sCellDeactivationTimer expires for the SCell, the UE deactivates the SCell. If deactivating the SCell, the UE may clear/remove all the configured uplink grant and downlink assignment. Or, if deactivating the SCell, the UE may suspend the configured uplink grant and downlink assignment. The UE does not transmit/receive any MAC PDU by using the configured uplink grant or configured downlink assignment for the deactivated SCell.

If the deactivated SCell is activated by the network, then according to some implementations, the UE does not transmit/receive any MAC PDU by using the configured uplink grant or configured downlink assignment unless the UE receives an SPS activation command by the network. Or, if the configured uplink grant or configured downlink assignment on the SCell was suspended upon deactivation of the SCell, the UE may transmit/receive a MAC PDU by using the configured uplink grant or configured downlink assignment upon activation of the SCell.

If the UE receives an Activation/Deactivation MAC control element deactivating the SCell from the network or the sCellDeactivationTimer associated with the activated SCell expires, the UE checks SCell index from the Activation/Deactivation MAC control element, if needed, and deactivates the corresponding SCell and stops the sCellDeactivationTimer associated with the SCell.

In general, implementations of the present disclosure may be applied to any type of UE, e.g., MTC UE, NB-IoT UE, normal UE.

In NR, the MAC entity (at UE or BS) according to implementations of the present disclosure performs operations, for example, for each time unit and for each configured SCell that include:
  if an SCell Activation/Deactivation MAC CE is received
    in this time unit activating the SCell:
    activate the SCell:
    start or restart the sCellDeactivationTimer associated
      with the SCell.
  else if an SCell Activation/Deactivation MAC CE is
    received in this time unit deactivating the SCell; or
  if the sCellDeactivationTimer associated with the activated SCell expires in this time unit:
    deactivate the SCell;
    stop the sCellDeactivationTimer associated with the
      SCell;
    flush all HARQ buffers associated with the SCell.
  if PDCCH on the activated SCell indicates an uplink grant
    or downlink assignment; or
  if PDCCH on the Serving Cell scheduling the activated
    SCell indicates an uplink grant or a downlink assignment for the activated SCell; or
  if uplink grant or downlink assignment is configured on
    the activated SCell:
    if there is a MAC PDU transmitted or received on the
      uplink grant or the downlink assignment:
      restart the sCellDeactivationTimer associated with
        the SCell.

Figure 10:
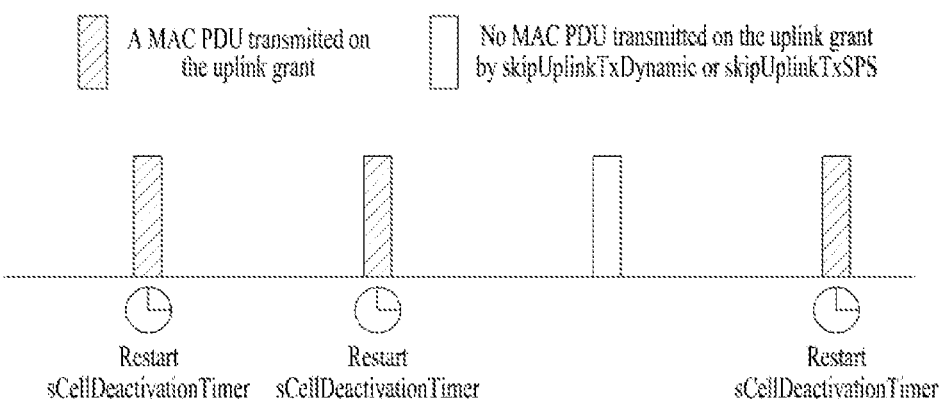
FIG. 10 illustrates an operation example of a SCell deactivation timer according to some implementations of the present disclosure.

FIG. 10 illustrates an example operation of a SCell deactivation timer according to some implementations of the present disclosure.

In the example of FIG. 10, the first, the second, and the fourth uplink grant on a SCell are used to transmit a MAC PDU and the UE restarts the sCellDeactivationTimer associated with the SCell. However, the third uplink grant is not used to transmit a MAC PDU and the UE does not restart the sCellDeactivationTimer associated with the SCell.

The implementations disclosed herein may also be applied to the network (e.g. BS) in the same manner as that of a UE since activation/deactivation status of a SCell shall be synchronized between the UE and the network. Referring to the example of FIG. 9, the network may activate a SCell of the UE (S910). On the SCell, if the network has an uplink grant or a downlink assignment in a time unit, then the network checks whether the network actually receives a MAC PDU on the uplink grant or actually transmits a MAC PDU on the downlink assignment (S930). If the network does not receive or transmit the MAC PDU by using the uplink grant or the downlink assignment on the SCell in the time unit (S930, No), then the network does not restart the sCellDeactivationTimer associated with the SCell in the time unit. If the network receives the MAC PDU on the uplink grant or transmits the MAC PDU on the downlink assignment on the SCell in the time unit (S930, Yes), then the network restarts the sCellDeactivationTimer associated with the SCell in the time unit (S950). As such, the network restarts the sCellDeactivationTimer for the SCell only when the network actually receives or transmits a MAC PDU by using the uplink grant or downlink assignment. Conversely, the network does not restart the sCellDeactivationTimer for the SCell in the time unit if the network does not receive or transmit a MAC PDU by using the uplink grant or downlink assignment in the time unit (unless another restart condition for the sCellDeactivationTimer is satisfied in the time unit).

Figure 11:
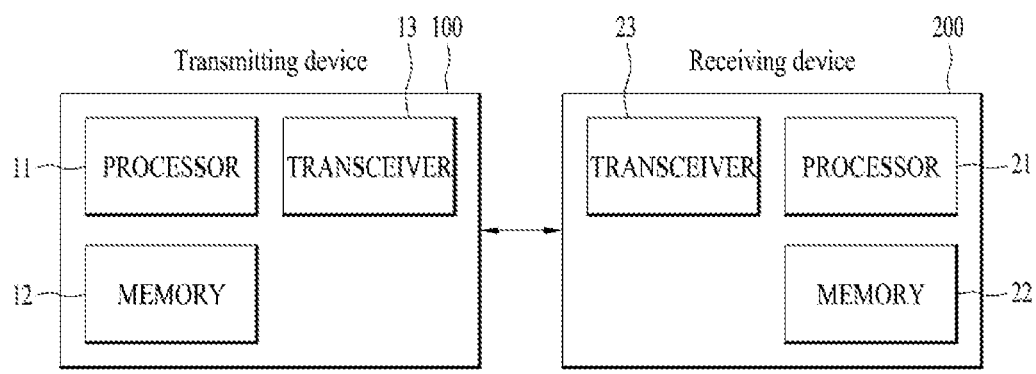
FIG. 11 is a block diagram illustrating an example of elements of a transmitting device 100 and a receiving device 200 according to some implementations of the present disclosure.

FIG. 11 is a block diagram illustrating an example of elements of a transmitting device 100 and a receiving device 200 according to some implementations of the present disclosure.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present disclosure. For example, the operations occurring at the protocol stacks (e.g. PDCP, RLC, MAC and PHY layers) according to the present disclosure may be performed by the processors 11 and 21. The protocol stacks performing operations of the present disclosure may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. The present disclosure may be implemented using firmware or software, and the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include $N_t$ (where $N_t$ is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include $N_r$ (where $N_r$ is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An transceiver supporting a MIMO function of transmitting and receiving data using a plurality of antennas may be connected to two or more antennas. The transceivers 13 and 23 may be referred to as radio frequency (RF) units.

In the implementations of the present disclosure, a UE operates as the transmitting device 100 in UL and as the receiving device 200 in DL. In the implementations of the present disclosure, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present disclosure, or control the UE transceiver to receive or transmit signals according to the present disclosure. The BS processor can be configured to operate according to the present disclosure, or control the BS transceiver to receive or transmit signals according to the present disclosure.

The processor 11 (at a UE and/or at a BS) checks whether there is a UL grant or DL assignment for a serving cell in a time unit. If there is a UL grant or DL assignment for the serving cell in the time unit, the processor 11 checks whether a data unit is actually present on the UL grant or DL assignment in the time unit, in order to determine whether to restart a deactivation timer associated with the serving cell which has been started. The processor 11 restarts the deactivation timer associated with the serving cell in the time unit if there is a data unit present on the UL grant or DL assignment in the time unit. The processor 11 does not restart the deactivation timer associated with the serving cell in the time unit if there is no data unit present on the UL grant or DL assignment in the time unit, unless another condition that the processor 11 should restart the deactivation timer is satisfied. The processor 11 does not restart the deactivation timer associated with the serving cell in the time unit if there is no data unit present on the UL grant or DL assignment in the time unit and if an activation command for activating the serving cell is not present in the time unit. The processor 11 may be configured to check whether a data unit is actually present on the UL grant or DL assignment on the serving cell in the time unit in order to determine whether to restart the deactivation timer of the serving cell, if the UL grant or DL assignment is a configured grant/assignment which is configured by RRC to occur periodically on the serving cell. The processor 11 may be configured to check whether a data unit is actually present on the UL grant or DL assignment on the serving cell in the time unit in order to determine whether to restart the deactivation timer of the serving cell, if the UL grant or the DL assignment is a dynamic grant/assignment which is indicated by a PDCCH. The processor 11 may be configured to check whether a data unit is actually present on the UL grant or DL assignment on the serving cell in the time unit in order to determine whether to restart the deactivation timer of the serving cell, if the serving cell is a SCell of the UE. The processor 11 (at the UE and/or the BS) deactivates the serving cell upon expiry of the deactivation timer associated with the serving cell.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:
1. A method of performing, by a user equipment (UE), wireless communication using a serving cell in a wireless communication system, the method comprising:
    starting a deactivation timer associated with a secondary cell (SCell) among serving cells of the UE, the deactivation timer relating to a duration of time after which the SCell is to be deactivated;
    determining whether a medium access control (MAC) protocol data unit (PDU) is present on a resource assigned to the UE for the SCell;
    based on a determination that a MAC PDU is present on the assigned resource, restarting the deactivation timer associated with the SCell; and
    based on a determination that no MAC PDU is present on the assigned resource, keeping the deactivation timer associated with the SCell running.

2. The method according to claim 1, wherein the assigned resource is a uplink (UL) grant for the SCell, and the UE does not generate a MAC PDU for the UL grant when specific conditions are met, and
    wherein the specific conditions include at least:
    the MAC PDU for the UL grant includes no MAC service data unit (SDU).

3. The method according to claim 1, wherein the assigned resource is a uplink (UL) grant for the SCell or a downlink (DL) assignment for the SCell.

4. The method according to claim 1, wherein the assigned resource is allocated by a physical downlink control channel (PDCCH).

5. The method according to claim 1, wherein the assigned resource is configured semi-statically for the SCell and occurs periodically on the SCell.

6. The method according to claim 1, further comprising:
    determining an expiration of the deactivation timer associated with the SCell; and
    deactivating the SCell based on a determination of the expiration of the deactivation timer associated with the SCell.

7. A device for a user equipment (UE), the device comprising:
    at least one processor; and
    at least one computer memory that is operably connectable to the at least one processor and that has stored thereon instructions which, when executed, cause the at least one processor to perform operations comprising:
    starting a deactivation timer associated with a secondary cell (SCell) among serving cells of the UE, the deactivation timer relating to a duration of time after which the SCell is to be deactivated;
    determining whether a medium access control (MAC) protocol data unit (PDU) is present on a resource assigned to the UE of for the SCell;
    based on a determination that a MAC PDU is present on the assigned resource, restarting the deactivation timer associated with the SCell; and
    based on a determination that no MAC PDU is present on the assigned resource, keeping the deactivation timer associated with the SCell running.

8. The device according to claim 7, wherein the assigned resource is a uplink (UL) grant for the SCell, and the operations comprise not generating a MAC PDU for the UL grant when specific conditions are met, and
    wherein the specific conditions include at least:
    the MAC PDU for the UL grant includes no MAC service data unit (SDU).

9. The device according to claim 7, wherein the assigned resource is a uplink (UL) grant for the SCell or a downlink (DL) assignment for the SCell.

10. The device according to claim 7, wherein the assigned resource is allocated by a physical downlink control channel (PDCCH).

11. The device according to claim 7, wherein the assigned resource is configured semi-statically for the SCell, and occurs periodically on the SCell.

12. The device according to claim 7, wherein the operations further comprise:
- determining an expiration of the deactivation timer associated with the SCell; and
- deactivating the SCell based on a determination of the expiration of the deactivation timer associated with the SCell.

13. A method of performing, by a base station (B S), wireless communication with a user equipment (UE) using a serving cell in a wireless communication system, the method comprising:
- starting a deactivation timer associated with a secondary cell (SCell) among serving cells of the UE, the deactivation timer relating to a duration of time after which the SCell is to be deactivated;
- determining whether a medium access control (MAC) protocol data unit (PDU) is present on a resource assigned to the UE for the SCell;
- based on a determination that a MAC PDU is present on the assigned resource, restarting the deactivation timer associated with the SCell; and
- based on a determination that no MAC PDU is present on the assigned resource, keeping the deactivation timer associated with the SCell running.

14. The method according to claim 13, wherein the assigned resource is allocated by a physical downlink control channel (PDCCH).

15. The method according to claim 13, wherein the assigned resource is configured semi-statically for the SCell and occurs periodically on the SCell.

16. The method according to claim 13, further comprising:
- determining an expiration of the deactivation timer associated with the SCell; and
- deactivating the SCell based on a determination of the expiration of the deactivation timer associated with the SCell.

17. A device for a base station (BS) of a wireless communication system, the device comprising:
- at least one processor; and
- at least one computer memory that is operably connectable to the at least one processor and that has stored thereon instructions which, when executed, cause the at least one processor to perform operations comprising:
  - starting a deactivation timer associated with a secondary cell (SCell) among serving cells of a user equipment (UE), the deactivation timer relating to a duration of time after which the SCell is to be deactivated;
  - determining whether a medium access control (MAC) protocol data unit (PDU) is present on a resource assigned to the UE for the SCell;
  - based on a determination that a MAC PDU is present on the assigned resource, restarting the deactivation timer associated with the SCell; and
  - based on a determination that no MAC PDU is present on the assigned resource, keeping the deactivation timer associated with the SCell running.

18. The device according to claim 17, wherein the assigned resource is allocated by a physical downlink control channel (PDCCH).

19. The device according to claim 17, wherein the assigned resource is configured semi-statically for the SCell and occurs periodically on the SCell.

20. The device according to claim 17, wherein the operations further comprise:
- determining an expiration of the deactivation timer associated with the SCell; and deactivating the SCell based on a determination of the expiration of the deactivation timer associated with the SCell.

* * * * *